United States Patent [19]

Yamamoto et al.

[11] Patent Number: 4,827,283
[45] Date of Patent: May 2, 1989

[54] LIGHTING CONTROL METHOD AND A LIGHTING CONTROL APPARATUS OF A LIGHT SOURCE IN AN IMAGE FORMING APPARATUS

[75] Inventors: Haruo Yamamoto, Osaka; Takao Ichihashi, Sakai, both of Japan

[73] Assignee: Mita Industrial Co., Ltd., Osaka, Japan

[21] Appl. No.: 126,373

[22] Filed: Nov. 30, 1987

[30] Foreign Application Priority Data

Nov. 28, 1986 [JP] Japan ................... 61-285542

[51] Int. Cl.[4] ........................................... G03G 15/00
[52] U.S. Cl. .................... 355/14 E; 355/233; 355/228
[58] Field of Search ............... 355/3 R, 3 CH, 14 E, 355/14 CH, 8

[56] References Cited

U.S. PATENT DOCUMENTS

| | | | |
|---|---|---|---|
| 4,697,913 | 10/1987 | Kuramoto et al. | 355/3 R |
| 4,702,590 | 10/1987 | Usami | 355/14 EX |
| 4,710,785 | 12/1987 | Mills | 355/14 EX |
| 4,716,439 | 12/1987 | Acquaviva | 355/14 EX |
| 4,737,819 | 4/1988 | Taniguchi | 355/14 E |

FOREIGN PATENT DOCUMENTS 60-136728  7/1985  Japan.

Primary Examiner—A. C. Prescott

[57] ABSTRACT

A lighting control method and an apparatus thereof which determine during the returning motion of the light source, whether the next paper is fed to the registration roller, and if it is determined that the paper is fed, the light source is caused to turn on from the point of the determination, thereby causing the going motion for the next image forming operation without causing to stay the light source at the home position.

5 Claims, 5 Drawing Sheets

LIGHTING CONTROL METHOD AND A LIGHTING CONTROL APPARATUS OF A LIGHT SOURCE IN AN IMAGE FORMING APPARATUS

BACKGROUND OF THE INVENTION

The present invention relates to a lighting control method and a lighting control apparatus of a light source in an image forming apparatus, and more particularly to a method and apparatus for controlling the timing to cause a light source to light in an image forming apparatus, wherein, by causing the light source which reciprocates for a prescribed number of times to light while the light source goes on, a reflected light from an original document is obtained by illuminating a sheet of original document, and based on such reflected light, an image is formed on a plurality of papers which is conveyed through a paper conveying section.

There has conventionally been provided an electrophotographic copying apparatus which is a kind of an image forming apparatus, wherein if a reproducible large sized original document is used, it is possible to prevent danger involved in moving the original document table and increased burden in a driving system for large sized original document table, and it is possible to install a document feeder in the apparatus, in which a transparent plate for placing an original document thereon is fixed so as to illuminate all over the surface of the original document by causing the light source to move reciprocatingly under the transparent plate.

In such a light source movable type electrophotographic copying apparatus, a location some distance away from one end of the transparent plate is made a home position of the light source, the light source is caused to turn on continuously during a going period in which the light source moves from the home position as a starting point, and the light source is caused to turn off continuously during a returning period in which the light source moves to the home position as a terminal.

Therefore, by accomplishing sequentially a necessary number of going motion of the light source while it is turned on and returning motion of the light source while it is turned off, it is possible to obtain continuously a plurality of number of sheets of reproduction with respect to one original document (continuous copying mode).

In an electrophotographic copying apparatus having the above constitution, in order to make the size of the body of the electrophotographic copying apparatus as small as possible, the distance between the home position and the end of the transparent plate is set to as small a distance as possible, so that the light source is caused to start to turn on while the light source is stopping at the home position and the light source is caused to move after a prescribed time has elapsed to stabilize the light source after it is turned on. Therefore, it is so arranged that the light source gives forth the light stably when the illumination of the original document on the transparent plate is started.

However, because the time the light source is stopping at the home position is long and as a result thereof the start of the paper conveying toward a photoreceptor from a registration roller is delayed, there exists a problem that it is not possible to improve the copying speed when continuous copying is necessary. In addition, because the time the light source is turned on in the neighbourhood to the home position is long, there also exists a problem that considerable temperature rise is caused in such area.

Especially, when a number of paper feeding cassette are stacked one upon another, the time required to convey paper to the registration roller varies, and if the light source is set to turn on according to the shortest time required to convey the paper from the paper feeding cassette to the registration roller, the light source will be turned on for a long time in case the time required for paper feeding is long and the temperature rise becomes all the more noticeable.

Furthermore, an electrophotographic copying apparatus capable of detecting a size of an original document is used, in which an optical system goes on to expose a portion where the original document is placed according to the detected size of the original document and returns back. In such an electrophotographic copying apparatus, for instance, a reducing magnification mode from A3 size to A4 size is set, whereas a B5 sized document is really set on the transparent plate. In this case, the optical system moves more quickly than in a normal mode since the reducing magnification mode is selected, and returns back to the home position if the exposure on the B5 sized document is complete. Therefore, it takes a long time from a time point where the light source has returned to the home position to a time point where the next paper is conveyed to the registration roller, as a result of which, the time the light source is turned on continuously at the home position becomes considerably long, causing the temperature rise in the neighbourhood of the home position to be further noticeable.

In addition to the above electrophotographic copying apparatus, there is proposed an electrophotographic copying apparatus wherein the time required for continuous copying is reduced by causing a light source to turn on preliminarily before the light source returns to the home position (Unexamined Japanese Patent Publication No. 136728/1985).

In an electrophotographic copying apparatus having a constitution such as above, wherein if the paper feeding cassettes are stacked one on top the other in the apparatus, there is no consideration given at all to prevent variation of the time required to convey the paper to the registration roller, and therefore, under a condition where a paper feeding cassette is selected whereby the time to feed the paper to the registration roller takes long, there is a high possibility that the time the light source is turned on becomes considerably longer as compared with the original lighting time of the light source, and a result of which, the temperature rise in the neighbourhood of the home position can become excessively high.

SUMMARY OF THE INVENTION

An object of the present invention is to provide a lighting control method and a lighting control apparatus of a light source in an image forming apparatus, in which abnormal temperature-rise in the neighbourhood of the home position is prevented, and it is made possible to cause the image forming speed to increase when accomplishing a continuous image forming operation.

For the purpose of achieving the above object, the lighting control method of the light source according to the present invention comprises illuminating original document by causing the light source to turn on while the light source is going on, causing the light source to turn off and to return when the illumination on the original document is completed, determining whether a paper whereon an image is to be formed is conveyed to registration means at a time point before the light source reaches the home position, in case the paper is conveyed to the registration means, causing the light source to turn on before it reaches the home position, and causing the light source to go on to form the next image with the light source being kept turned on immediately after the light source has reached the home position, thereby forming the same image on a plurality of number of sheets of paper.

According to the lighting control method of a light source as described above, at a time point before the light source reaches the home position, it is determined whether the paper whereon the next image is to be formed is conveyed to the registration means, and only in case the paper is conveyed to the registration means the light source is caused to turn on before it reaches the home position. Immediately after the light source has reached the home position the light source is caused to go on to form the next image, therefore, it is possible to secure stable lighting condition when the light source illuminates the original document and to prevent the light source from stopping being kept lighted for a time more than necessary in the neighbourhood of the home position. Therefore, in case the paper is already conveyed to the registration means, it becomes possible to cause the going motion to be performed to form the next image without causing the light source to stop particularly.

The lighting control apparatus of the present invention comprises light source detecting means which detects that the light source has returned to a position at a prescribed distance from the home position, paper detecting means which detects that the paper has been conveyed to registration means, and light source control means which at a time point when a light source detecting signal is supplied from the light detecting means causes the light source to turn on based on a condition that the paper detecting signal is supplied from a paper detecting means so as to cause the lighting condition to continue thereafter until the next illumination of the original document is completed.

According to the lighting control apparatus having the constitution such as above, the light source detecting means detects that the light source has returned to a position at a prescribed distance from the home position, and the paper detecting means detects that the paper has been conveyed to the registration means. In case a light source detecting signal is supplied from the light source detecting means, based on a condition that a paper detecting signal is supplied from the paper detecting means, the light source is caused to turn on by the light source control means to allow the lighting condition to continue thereafter until the illumination of the original document is completed. Therefore, in case the paper has already been conveyed to the registration means when the light source has returned to the prescribed position of above, the image formation with respect to the next paper is ready. Therefore, the light source is caused to turn on and is caused to reach the home position with the light source kept lighted immediately to perform the going motion, and it is possible to illuminate the original document by the light source which is stably kept lighted and to accomplish the image formation corresponding to the original document. It is also possible to prevent the light source from stopping being kept lighted for a time more than necessary in the neighbourhood of the home position.

The features of the electrophotographic copying apparatus according to the present invention as described above will further be apparent as they will be explained more in detail with reference to the attached drawings.

DETAILED DESCRIPTION OF THE EMBODIMENTS

Figure 4:
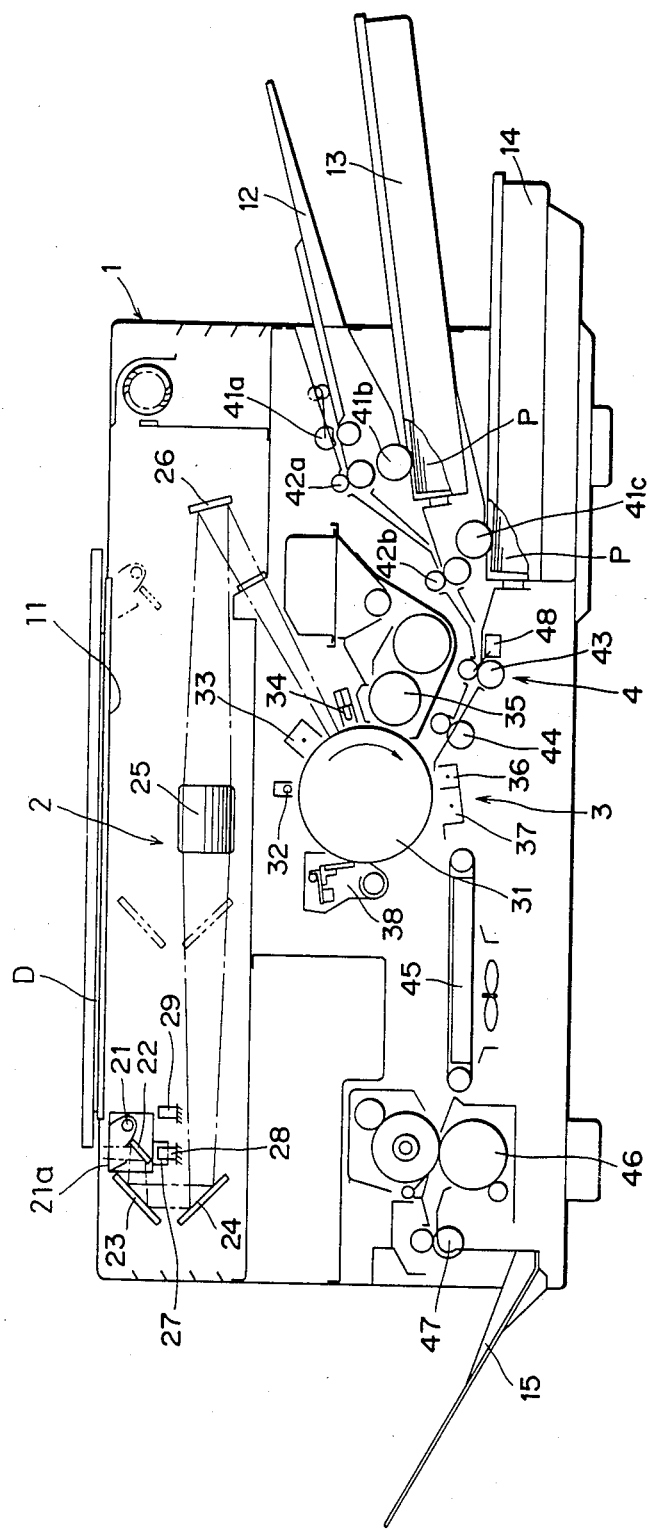
FIG. 4 is a schematic diagram showing an internal structure of an electrophotographic copying apparatus.

FIG. 4 schematic diagram illustrating an internal structure of an electrophotographic copying apparatus which is an example of an image forming apparatus, wherein in the upper part thereof is provided with a transparent plate 11, and an original document presser (not shown in the diagram), and inside of the body 1 of the electrophotographic copying apparatus is provided with an optical system 2, an image processing section 3, and a paper conveying section 4.

To describe further in detail, the optical system 2 comprises a light source 21 which illuminates the original document D set on the top surface of the transparent plate 11, mirrors 22, 23, and 24 which reflect in sequence the reflecting light from the original document D, a lens 25, and a mirror 26. The light source 21 and the mirror 22 are installed on one frame 21a and is moved integrally by a driving motor (not shown in the diagram) by means of a pulley and a wire. The mirror 23 and 24 are also installed on another frame and are caused to move in the same direction at a half the speed of the moving speed of the frame 21a by means of the pulley and wire. By this arrangement, it is made possible that all over the surface of the original document D is illuminated sequentially so as to lead the reflecting light focused on the image processing section 3 through the lens 25 and the mirror 26. Furthermore, the frame 21a is integrally installed with a shade plate 27, and photo interruptors 28 and 29 which are so arranged as to shut off the optical path by the shade plate 27 are respectively disposed at a home position and a position where illumination of the original document D starts.

In the image processing section 3, there are disposed around a photoreceptor drum 31 which always rotate in one direction components according to the order of a discharger lamp 32, a corona discharger 33, blank lamp 34, a developing device 35, a transferring corona discharger 36, a separating corona discharger 37, and a cleaner 38. After the uniform charging is accomplished by the corona discharger 33 with respect to the surface of the photoreceptor drum 31 wherefrom the residual charge is caused to disappear by the discharging lamp 32, an electrostatic latent image is formed corresponding to an image of the original document by leading the reflecting light from the original document D, the charge of the unnecessary portion is caused to disappear by the blank lamp 34, the portion which is not caused to disappear is formed into a toner image by the developing device 35, and the toner image is transferred on the copying paper P by the transferring corona discharger 36. Thereafter, the copying paper P is caused to peel off by the separating corona discharger 37, so as to finally recover the remaining toner on the surface of the photoreceptor drum 31 by the cleaner 38.

The paper conveying section 4 comprises a stack bypass 12 which is installed at a prescribed position on the side of the body 1 of the electrophotographic copying apparatus, paper feeding cassettes 13 and 14 which are detachably installed at the prescribed position on the side of the body 1 of the electrophotographic copying apparatus, paper feeding rollers 41a, 41b, and 41c, delivery rollers 42a and 42b, registration roller 43, delivery roller 44, delivery belt 45, fixing device 46, and discharging roller 47. Furthermore, by selectively driving the paper feeding rollers 41a, 41b or 41c, the copying paper P is supplied sheet by sheet from either of the stack bypass 12 and the paper feeding cassettes 13 and 14, and by providing further a delivery force to the delivery roller 42a or 42b as required, the tip of the copying paper P is caused to contact the registration roller 43 and to slightly deflect so as to accomplish the tip correction. In this case, a stopper may be provided on the upstream of the registration roller 43 so that the delivery is caused to stop temporarily with the copying paper P being in contact with the stopper.

Immediately before the registration roller 43 is disposed a copying paper detecting switch 48. Furthermore, the copying paper detecting switch 48 may be provided on the downstream from the registration roller 43 so as to form the filing margin automatically on the copying paper P.

Afterwards, the registration roller 43 is driven according to a timing of the light source 21 which has reached a position to start illumination of the original document D, and the copying paper P is conveyed under a condition where the copying paper P is caused to synchronize with the electrostatic latent image formed on the surface of the photoreceptor drum 31. The copying paper P is transferred with the toner image by the transferring corona discharger 36 and is caused to peel off from the photoreceptor drum 31 by the separating corona discharger 37. Afterwards, the copying paper P is led to the fixing device 46 by the delivery belt 45 so that the toner image is heated and fixed, and is discharged by the discharging roller 47 onto the paper tray installed on the side opposite to the body 1 of the electrophotographic copying apparatus.

Figure 1:
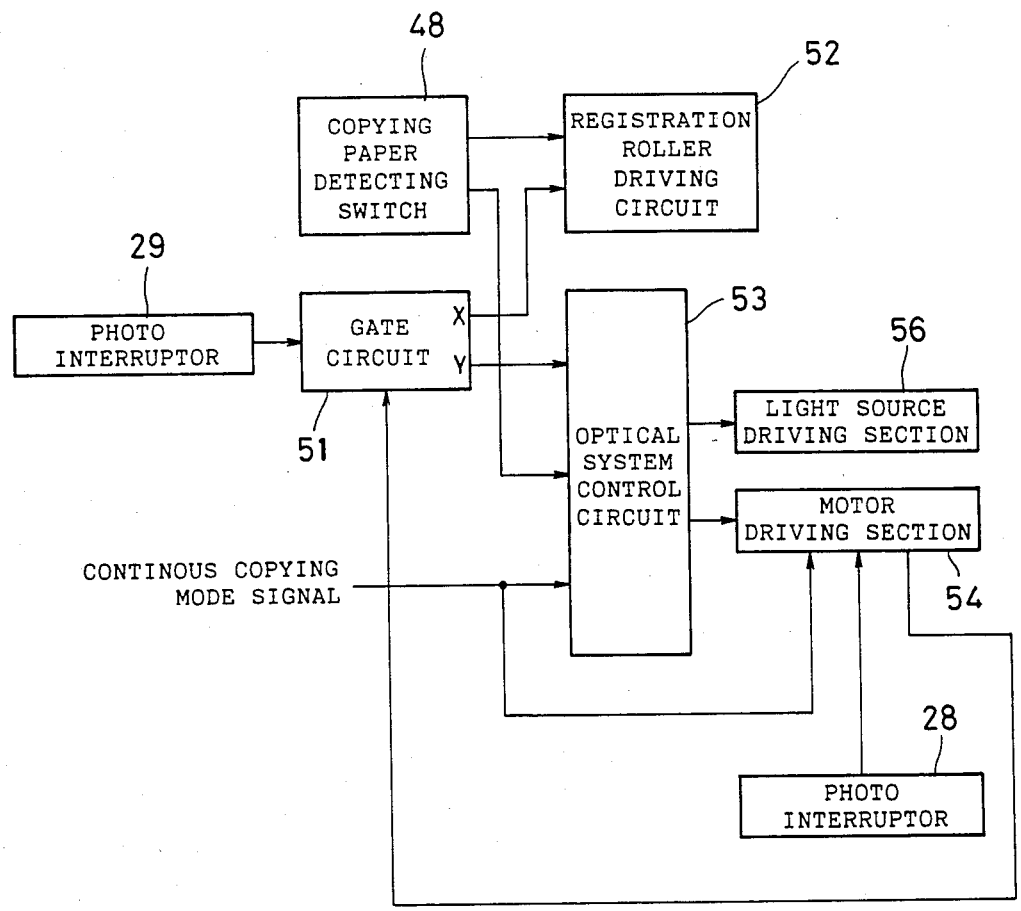
FIG. 1 block diagram showing an electrical structure of a lighting control apparatus of a light source.

FIG. 1 is a block diagram showing essential components of the electrical structure of an embodiment of the lighting control apparatus of the light source. A gate circuit 51 directs the detecting signal from the photo interruptor 29 responsive to the moving direction of the frame 21a and outputs the detecting signal selectively from the first output terminal X or the second output terminal Y. That is to say, the gate circuit 51 detects the rotational direction of the driving motor according to the signal from the motor driving section 54 which controls the rotation of the driving motor to move the frame. In case the frame 21a is moving into going direction, the gate of the first output terminal X is opened and the detection signal from the photo interruptor 29 is issued to the first output terminal X. In case the frame 21a is moving into returning direction, the gate circuit 51 opens the gate of the second output terminal Y and issues the detecting signal from the photo interruptor 29 to the second output terminal Y. The output signal from the first output terminal X of the gate circuit 51 and the copying paper detecting signal from the copying paper detecting switch 48 are supplied to the registration roller driving circuit 52 which drives the registration roller 43, and the registration roller driving circuit 52 drives the registration roller 43 only when the two signals of above have been inputted. An optical system control circuit 53 is supplied with the signal which indicates that the continuous copying mode is selected (continuous copying mode signal), the output signal from the second output terminal Y of the gate circuit 51, and the copying paper detecting signal from the copying paper detecting switch 48. The optical system control circuit 53 causes the light source driving section 56 to operate at a prescribed timing thereby to turn on the light source 21, and supply the prescribed control signal to the motor driving section 54 so that the movement of the frame 21a is controlled. The motor driving section 54 controls the rotation of the driving motor which causes the frame 21a to perform the going motion or the returning motion, and is supplied with the continuous copying mode signal, the output signal from the optical system control circuit 53, and the detecting signal from the photo interruptor 28. The portion where the light source is turned off at a timing of the frame 21a which starts to perform the returning motion is not shown in the diagram.

When the copy button (not shown in the diagram) is depressed, the copying paper P is conveyed to a position where it contacts the registration roller 43, the light source 21 is turned on, and the frame 21a starts to perform the going motion. Operations of the foregoing electrical structure will hereafter be described. When the copying paper P is conveyed to a position where it contact the registration roller 43, the copying paper detecting switch 48 issues the copying paper detecting signal. After the frame 21a starts the going motion and the detecting signal is issued from the photo interrupter 29, the gate circuit 51 opens the gate of the first output terminal X and causes the registration roller driving circuit 52 to operate. As a result of this, the registration roller 43 is driven and the copying paper P is conveyed to the photoreceptor drum 31.

If the detecting signal of the frame 21a is issued by the photo interruptor 29 when the illumination of the original document D is completed and the frame 21a has returned with the light source 21 being turned off, the gate circuit 51 opens the gate of the second output terminal Y. When the optical system control circuit 53 receives the signal from this second output terminal Y, it drives the light source driving section 56 to turn on the light source 21, on condition that the optical system control circuit 53 has received the continuous copying mode signal and that it has been ditected by the copying paper detecting switch 48 that the next copying paper P is conveyed to a position where it contacts the registration roller 43. At the same time, the optical system control circuit 53 issues to the motor driving section 54 an output signal which forbids to stop the rotation of the driving motor when the frame 21a has reached the home position. In other words, in case the lighting control of the light source of the present invention is not accomplished and the frame 21a has reached the home position, the driving motor stops rotating and the frame 21a comes to a stop. However, in this embodiment, optical system control circuit 53 issues beforehand to the motor driving section 54 an output signal which forbids to stop the rotation of the driving motor when the frame 21a has reached the home position. Under such condition, the frame 21a performs the returning motion as it is, and when the frame 21a is detected by the photo interruptor 28, that is, when the frame 21a has reached the home position, the motor driving section 54 receives the continuous copying mode signal, and further receives the output signal from the optical system control circuit 53 and the detecting signal from the photo interruptor 28 thereby causing the driving motor to rotate reversely so as to immediately move the frame 21a in going direction.

If the copying paper P is not detected by the copying paper detecting switch 48 when the light source detecting signal is issued from the photo interruptor 29, the optical system control circuit 53 does not issue the lighting control signal to the light source driving section 56 nor it issues to the motor driving section 54 an output signal which causes the frame 21a to continue its movement as it is. Therefore, the frame 21a continues the returning motion to the home position with the light source 21 being turned off. In this case, as in the same manner as a conventional electrophotographic copying apparatus, the light source 21 is turned on when the copying paper P is detected by the copying paper detecting switch 48, and the frame 21a starts the going motion when a prescribed time necessary to stabilize the lighting condition of the light source 21 has elapsed.

Figure 2:
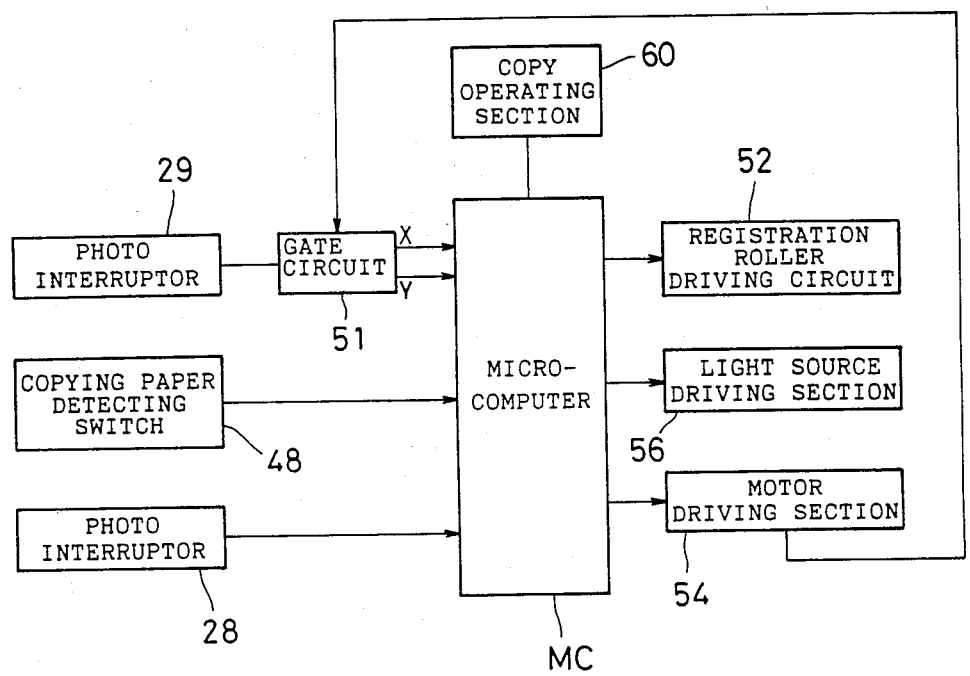
FIG. 2 block diagram showing an electrical structure of another embodiment of a lighting control apparatus of a light source.

For the purpose of causing the foregoing operations to be accomplished, a use of microcomputer is also possible. An example of a circuit of the lighting control apparatus of the light source using a microcomputer is shown in FIG. 2. At the input port of the microcomputer MC are connected the first output terminal X and the second output terminal Y of the gate circuit 51, the detecting signal output terminal of the copying paper detecting switch 48, and the detecting signal output terminal from the photo interruptor 28 respectively. Signals which drive the registration roller driving circuit 52, light source driving section 56, and motor driving section 54 are supplied from the output port of the microcomputer MC to operate the above circuits and sections respectively. The detecting signal terminal of the photo interruptor 29 is connected to the gate circuit 51. Numeral 60 is a copy operating section connected to the microcomputer MC, and the copy operating section has keys such as the print key, number of copy setting key, continuous copying mode selecting key, and copy size selecting key (all these keys are not shown in the diagram).

Except that all the communications of input and output signals are accomplished through the microcomputer MC, functions and operations of the gate circuit 51, detecting switch 48, photo interruptors 28 and 29, registration roller driving circuit 52, light source driving section 56 and motor driving section 54 are essentially the same as those described in FIG. 1 and therefore will be omitted.

Figures 1, 3:
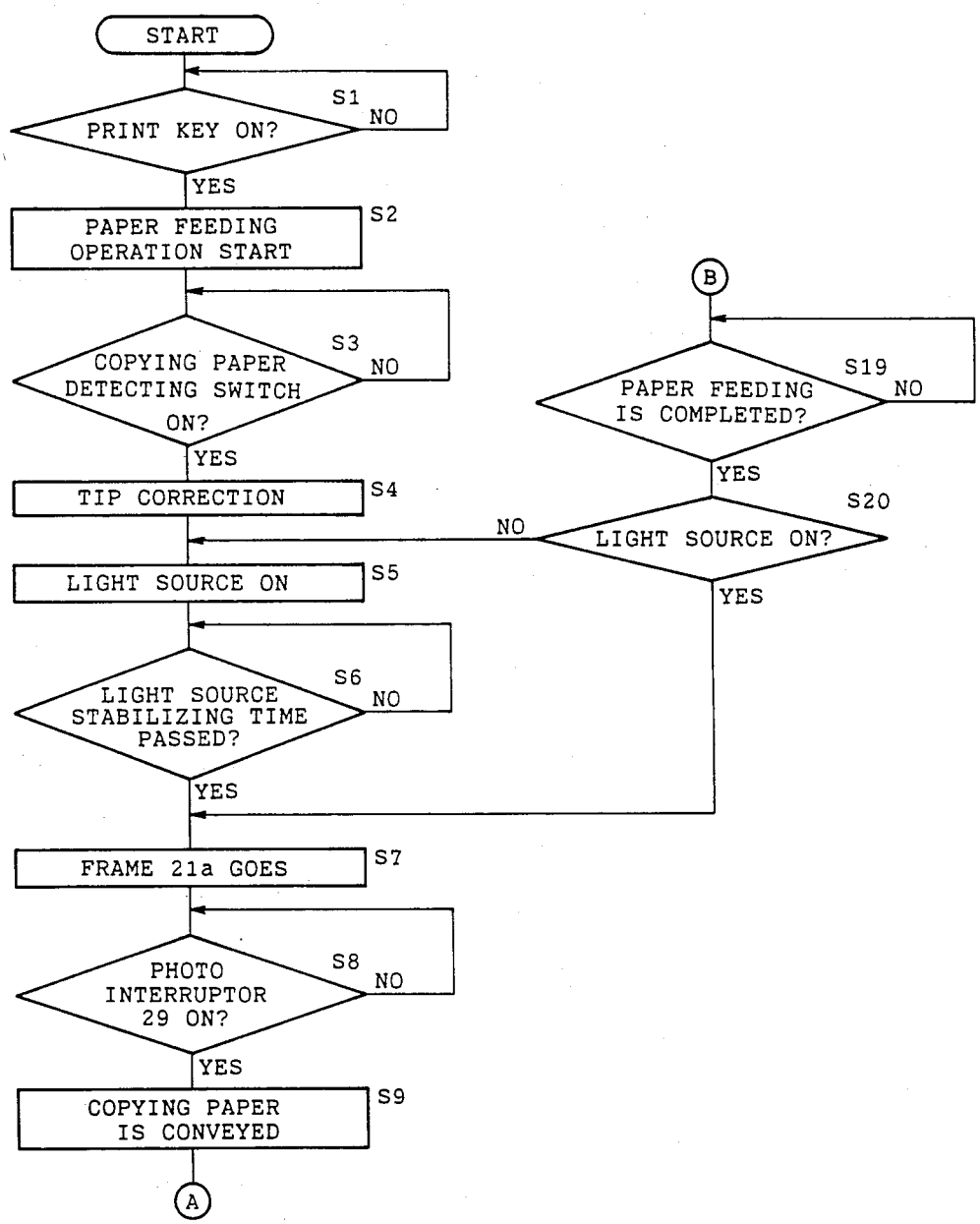
FIG. 3 is a flowchart describing the lighting control operation in the lighting control apparatus shown in FIG. 2.
Figures 2, 3:
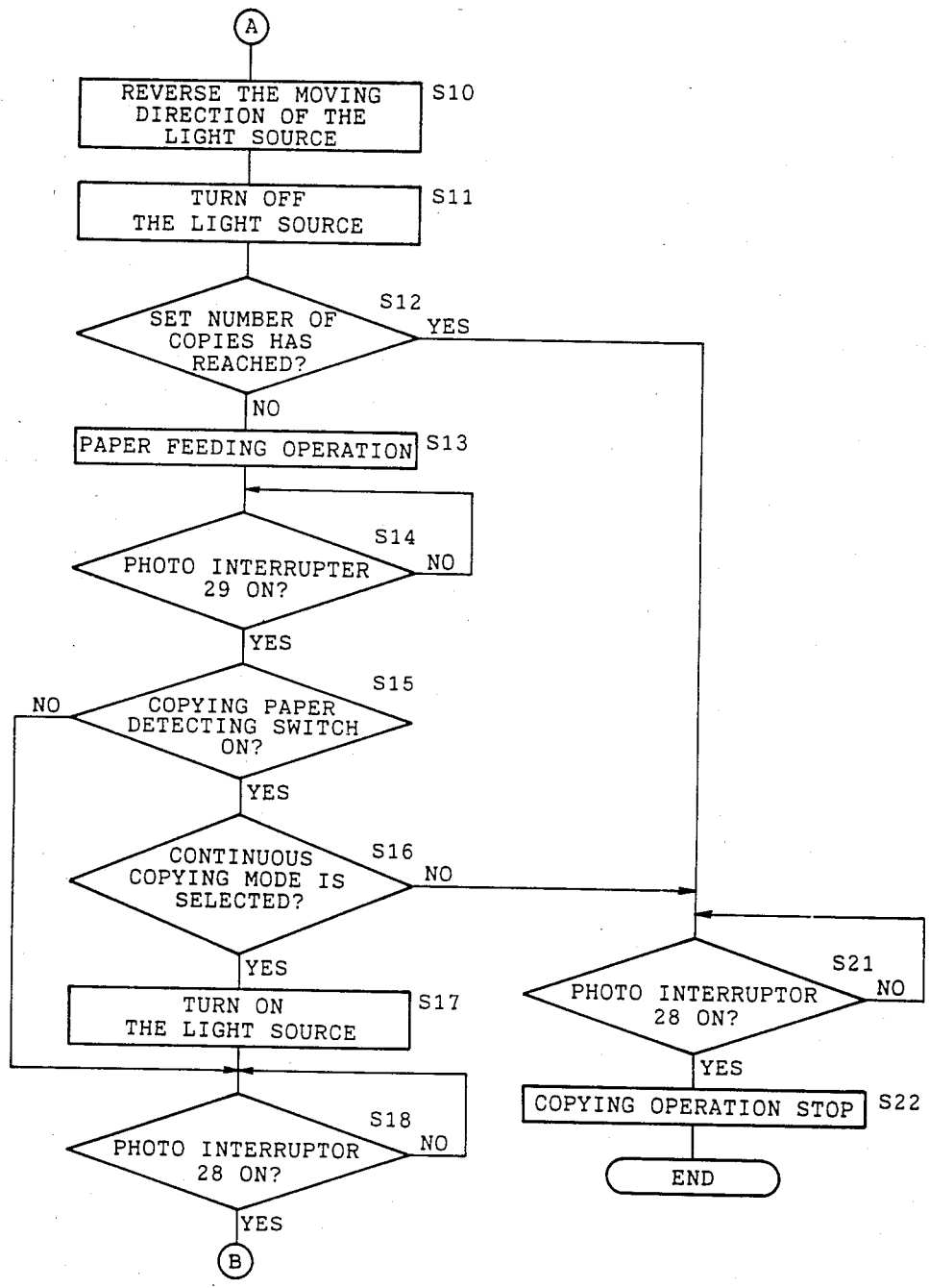

FIG. 3 will be used to describe the flowchart which shows the continuous copying sequences of an electrophotographic copying apparatus incorporating the foregoing lighting control apparatus of the light source.

In step S1, the step is caused to wait until the print key is operated, in step S2, the paper feeding operation is caused to start, in step S3, the copying paper detecting switch 48 is caused to wait until it detects the copying paper P, and in step S4, the paper feeding operation is further performed for a prescribed time to accomplish the tip correction.

Thereafter, in step S5, the light source 21 is caused to turn on, in step S6, the step is caused to wait for a time necessary to stabilize the light source (700 to 800 milli seconds for example, or a time shorter than this), and in step S7, the frame 21a is caused to perform the going motion. And, in step S8, when the frame 21a is detected by the photo interruptor 29, the registration roller 43 is driven in step S9 by means of the registration roller driving circuit 52, thereby to convey the copying paper P so as to cause the tip of the image on the photoreceptor drum to overlap on the tip of the copying paper P.

After the original document D is exposed of all over the surface thereof in such manner as above, the moving direction of the frame 21a is reversed in step S10 to cause the frame 21a to start the returning motion until it reaches the home position. During this process, the light source 21 is caused to turn off in step S11 to determine whether the number of copies counted in step S12 has reached the set number of the copy. If in the step S12 it is determined that the set number of the copy is not reached, the paper feeding operation is caused to perform in step S13 with respect to the next copying paper P, in step S14 the photo interruptor 29 is caused to wait until it detects the frame 21a which is returning, when the photo interruptor 29 detects the frame 21a, in step S15 it is determined that whether the copying paper P is detected by the copying paper detecting switch 48, more specifically, it is determined that whether the former copying paper P has passed the copying paper detecting switch 48 and the next copying paper P is being detected by the copying paper detecting switch 48.

If it is determined in the above step S15 that the copying paper P is detected, in step S16 it is determined that whether the continuous copying mode is selected, and if this mode is selected, in step S17 the light source 21 is caused to turn on by means of the light source driving section 56, and in step S18 the step is caused to wait until the moving frame 21a is detected by the photo interruptor 28, that is, until the frame 21a reaches the home position.

Conversely, if it is determined in the above step S15 that the copying paper P is not detected, the determination of step S18 will be accomplished.

In the above step S18, if the frame 21a is detected, in step S19 the step is caused to wait until the next copying paper P is completed of feeding (until the copying paper detecting switch 48 detects the copying paper P). If in step S15 the copying paper P is detected, the step immediately moves to the next step without waiting for the paper feeding of the next copying paper P is completed in step S19. In step S20, whether the light source 21 is turned on is determined. If it is determined that the light source 21 is turned on, determination and processing after the sep S7 are accomplished, and if it is determined that the light source is not turned on to the contrary, determination and processing after the step S5 are accomplished.

If it is determined in the above step S12 that the set number of copy is reached, or if it is determined in the above step S16 that the continuous copying mode is not selected, in step S21 the step is caused to wait until the frame 21a is detected by the photo interruptor 28, and in step S22 the copying operation is caused to stop.

To summarize the above, in a condition where the continuous copying mode is selected, it is possible to control whether the light source 21 is to be caused to immediately turn on according to a condition whether the next copying paper P is fed to the registration roller 43 at a time when the frame 21a has returned to the position where the photo interruptor 29 is installed.

Therefore, if the next copying paper P is not completed of feeding, the light source 21 is caused to turn on at the home position and to wait for a prescribed time, the going motion to illuminate the original document D is caused to operate, and conversely if the feeding of the next copying paper P is completed, the light source 21 is caused to turn on before the frame 21a is returned to the home position so as to immediately cause the frame 21a to accomplish the going motion without securing the stopping time at the home position.

As is apparent from the foregoing two embodiments, when the paper feeding is completed, it is possible to positively prevent the frame 21a from being held stopped in the neighborhood of the home position, to prevent abnormal temperature rise in the neighbourhood of the home position, and to achieve increased copying speed.

The lighting control method and the lighting control apparatus of the light source in the image forming apparatus of the present invention have been described using the foregoing embodiments, however, the present invention shall not be construed as being limited to the foregoing embodiments only. For example, instead of detecting the frame 21a by the photo interruptor 29, it is possible for example to provide a contacting type detecting switch to detect the frame 21a when it performs the going motion and the returning motion. Further, in case the contacting type detecting switch of above is used, it is also desirable to detect the going motion up to a prescribed position of the light source and to drive the registration means by interlocking it with the going motion of the frame 21a.

It is also possible to detect the position of the frame 21a during its returning motion by an encoder which operates synchronously with a driving source to drive the light source and an up-down counter which inputs the pulse signal outputted from the encoder. In this case, because it is possible to detect the position of the light source according to the contents of the up-down counter, it becomes possible to detect that the light source has returned to a prescribed position when the contents of the above up-down counter has reached a prescribed value, thereby enabling to perform the similar action as above based on the results of the detection.

Furthermore, it is possible to make various design changes to an extent that the substance of the present invention is not altered.

As have been described above, based on a condition that the feeding of the next paper is completed when the light source has returned to the prescribed position, the present invention, in performing the continuous image forming, is capable of causing the light source to turn on before it returns to the home position, and causing the light source to go on for next image forming without causing it to stop at the home position, therefore it is possible to increase the image forming speed and to prevent abnormal temperature rise in the neighbourhood of the home position.

What is claimed is:

1. A lighting control method of a light source in an image forming apparatus, which comprises illuminating an original document by causing the light source to turn on during its going motion, causing the light source to turn off and to return when the illumination on the original document is completed, determining whether a next paper whereon an image is to be formed is conveyed to registration means at a time point before the light source reaches the home position, in case said paper is conveyed to the registration means, then causing the light source to turn on before the light source reaches the home position, when the light source reached the home position causing the light source immediately to go on to accomplish the next image forming with the light source being kept turned on, thereby forming the same image on a plurality of number of sheets of paper.

2. A lighting control apparatus of a light source in an image forming apparatus comprising light source detecting means which detects that the light source has returned to a position at a prescribed distance from a home position, paper detecting means which detects that a paper to be copied has been conveyed to registration means, and light source control means which, at a time point when a light source detecting signal is supplied from the light source detecting means, causes the light source to turn on based on a condition that a paper detecting signal from the paper detecting means is supplied, so as to keep the lighting condition of the light source thereafter until illumination of the original document is completed.

3. A lighting control apparatus of a light source in an image forming apparatus according to claim 2, wherein the light source detecting means is a switch which detects a presence of a moving frame installed with the light source.

4. A lighting control apparatus of a light source in an image forming apparatus according to claim 2, wherein the paper detecting means is a switch which is installed near a registration roller and detects the tip of the paper.

5. A lighting control apparatus of a light source in an image forming apparatus according to claim 2, wherein the light source detecting means includes an encoder which is operated synchronously with a driving source to move the light source and an up-down counter which inputs a pulse signal which is outputted from the encoder.

* * * * *